(12) United States Patent
Bass et al.

(10) Patent No.: US 6,910,122 B1
(45) Date of Patent: Jun. 21, 2005

(54) METHOD AND APPARATUS FOR PRESERVING PIPELINE DATA DURING A PIPELINE STALL AND FOR RECOVERING FROM THE PIPELINE STALL

(75) Inventors: Stephen L. Bass, Fort Collins, CO (US); Rohit Bhatia, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 09/507,204

(22) Filed: Feb. 18, 2000

(51) Int. Cl.[7] .............................................. G06F 15/00
(52) U.S. Cl. ...................................... 712/219; 712/244
(58) Field of Search ................................. 712/219, 244

(56) References Cited

U.S. PATENT DOCUMENTS

| | | | | |
|---|---|---|---|---|
| 5,325,495 A | * | 6/1994 | McLellan .................... | 712/219 |
| 5,490,255 A | * | 2/1996 | Rawlinson et al. ......... | 712/219 |
| 5,859,999 A | * | 1/1999 | Morris et al. ............... | 395/565 |
| 5,860,017 A | * | 1/1999 | Sharangpani et al. ... | 395/800.23 |
| 6,038,658 A | * | 3/2000 | Chow ......................... | 712/219 |
| 6,163,839 A | * | 12/2000 | Janik et al. ................. | 712/219 |

OTHER PUBLICATIONS

Peatman, John B., The Design of Digital Systems, 1972, McGraw–Hill Book Company, p. 411.*
"Patents shed light on Merced" by Alexander Wolfe, Electronic Engineering Times, Feb. 15, 1999, pp. 43 and 44.*

* cited by examiner

Primary Examiner—Jeffrey Gaffin
Assistant Examiner—Justin Knapp (57) ABSTRACT

Methods and apparatus for stalling a pipeline, which methods and apparatus allow data in speed critical pipeline stages to propagate through additional stages of the pipeline. The data is then "caught" and stored in a deferred stall register as it is output from a downstream pipeline stage X. Finally, the data is output from the deferred stall register in a way that it masks the regular output of the pipeline stage X. In this manner, there is no need to store stalled data in a speed critical pipeline stage. Rather, the data can slip ahead, be saved, and be output at an appropriate time such that it appears that the data was stalled in the pipeline stage in which it existed at the time a stall was initiated.

21 Claims, 5 Drawing Sheets

|  |  | TIME | | | | |
|---|---|---|---|---|---|---|
|  |  | 0 | 1 | 2 | 3 | 4 |
| FIRST PIPELINE | FET_A | E1 | F1 | F1 | G1 | H1 |
|  | DEC_A | D1 | E1 | E1 | F1 | G1 |
|  | EXE_A | C1 | D1 | D1 | E1 | F1 |
|  | DET_A | B1 | C1 | C1 | D1 | E1 |
|  | WRB_A | A1 | B1 | B1 | C1 | D1 |
| CONTROL SIGNALS | STALL | 0 | 1 | 0 | 0 | 0 |
|  | LOAD | 0 | 0 | 0 | 1 | 0 |
|  | DRIVE | 0 | 0 | 0 | 0 | 1 |
| DSR ENTRY | DSR | - | - | - | C2 | C2 |
| SECOND PIPELINE | EXE_B1 | C2 | D2 | D2 | E2 | F2 |
|  | EXE_B2 | B2 | C2 | - | D2 | E2 |
|  | EXE_B3 | A2 | B2 | C2 | - | D2 |
|  | EXE_B4 | - | A2 | B2 | C2 | C2 |

METHOD AND APPARATUS FOR PRESERVING PIPELINE DATA DURING A PIPELINE STALL AND FOR RECOVERING FROM THE PIPELINE STALL

FIELD OF THE INVENTION

The invention pertains to the field of computers, and more particularly to the field of how a microprocessor's pipeline data is preserved during a pipeline stall, and to how a pipeline recovers from the pipeline stall.

BACKGROUND OF THE INVENTION

Many of today's microprocessors incorporate structures known as instruction pipelines. Instruction pipelines increase the efficiency of a processor by enabling a processor to simultaneously process a plurality of instructions. Instruction pipelines can be thought of as instruction assembly lines. As Instruction_0 enters the first stage of the pipeline, Instruction_1 is simultaneously processed in the second stage of the pipeline, Instruction_2 is simultaneously processed in the third stage of the pipeline, and so on. Periodically, a new instruction is clocked into an instruction pipeline, and each instruction being processed in the pipeline is passed to the next stage of the pipeline, or is output from the pipeline.

To maximize instruction execution efficiency, it is desirable to keep instruction pipelines full as often as possible (with an instruction being processed in each stage of the pipeline) such that each periodic clocking of an instruction pipeline produces a useful output. However, a pipeline will sometimes generate an exception, or will need more time to determine whether an exception might be about to occur. In either case, the pipeline needs to stall the progression of data through its stages until the exception can be resolved. Since many of today's microprocessors not only incorporate instruction pipelines, but incorporate multiple, parallel instruction pipelines, a stall of one of the parallel pipelines will often necessitate a stall of some or all of the other pipelines. For example, when a microprocessor executes instructions in program order, or executes groups of instructions between predetermined program stops, which groups of instructions must be executed in order, a stall which is initiated by a stage Y of a first pipeline often dictates the stall of any pipeline stage which is orthogonal to or upstream from stage Y.

Unfortunately, existing means for stalling pipeline data often have a negative impact on a pipeline's performance. For example, most stall means utilize a number of latches to store stalled data. However, in a speed critical pipeline stage, the need to latch data as it propagates through the stage results in costly and undesirable delay.

Furthermore, if a stall is generated late in a stage, data must often be stalled in the stage using recirculating latches rather than clocked latches. Recirculating latches cause a stage to not only incur a latch propagation delay, but can also cause a stage to incur wire delay, capacitive delay, etc. This is especially so when a stage which requires the use of recirculating latches is a data heavy stage.

For example, the multiply array of a floating-point multiply accumulate unit (FMAC) often spans two stages of a pipeline. As a result, the stall of data in the first stage of the multiply array requires the storage of numerous partial products. In addition, the route of a stall enable line over such a multiply array leads to an even greater density of wiring in the multiply array, and results in increased capacitance, etc.

What is needed are new methods and apparatus for stalling the data of speed critical pipeline stages.

SUMMARY OF THE INVENTION

To fulfill the above mentioned need, the inventors have devised new methods and apparatus for stalling pipeline data, which methods and apparatus allow data in speed critical pipeline stages to propagate through additional stages of the pipeline. The data is then "caught" and stored in a deferred stall register as it is output from a downstream pipeline stage X. Finally, the data is output from the deferred stall register in a way that it masks the regular output of the pipeline stage X. In this manner, there is no need to store stalled data within a speed critical pipeline stage. Rather, the data can slip ahead, be saved, and be output at an appropriate time such that it appears that the data was stalled in the pipeline stage in which it existed at the time a stall was initiated.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings, in which.

DESCRIPTION OF THE PREFERRED EMBODIMENT

Figure 1:
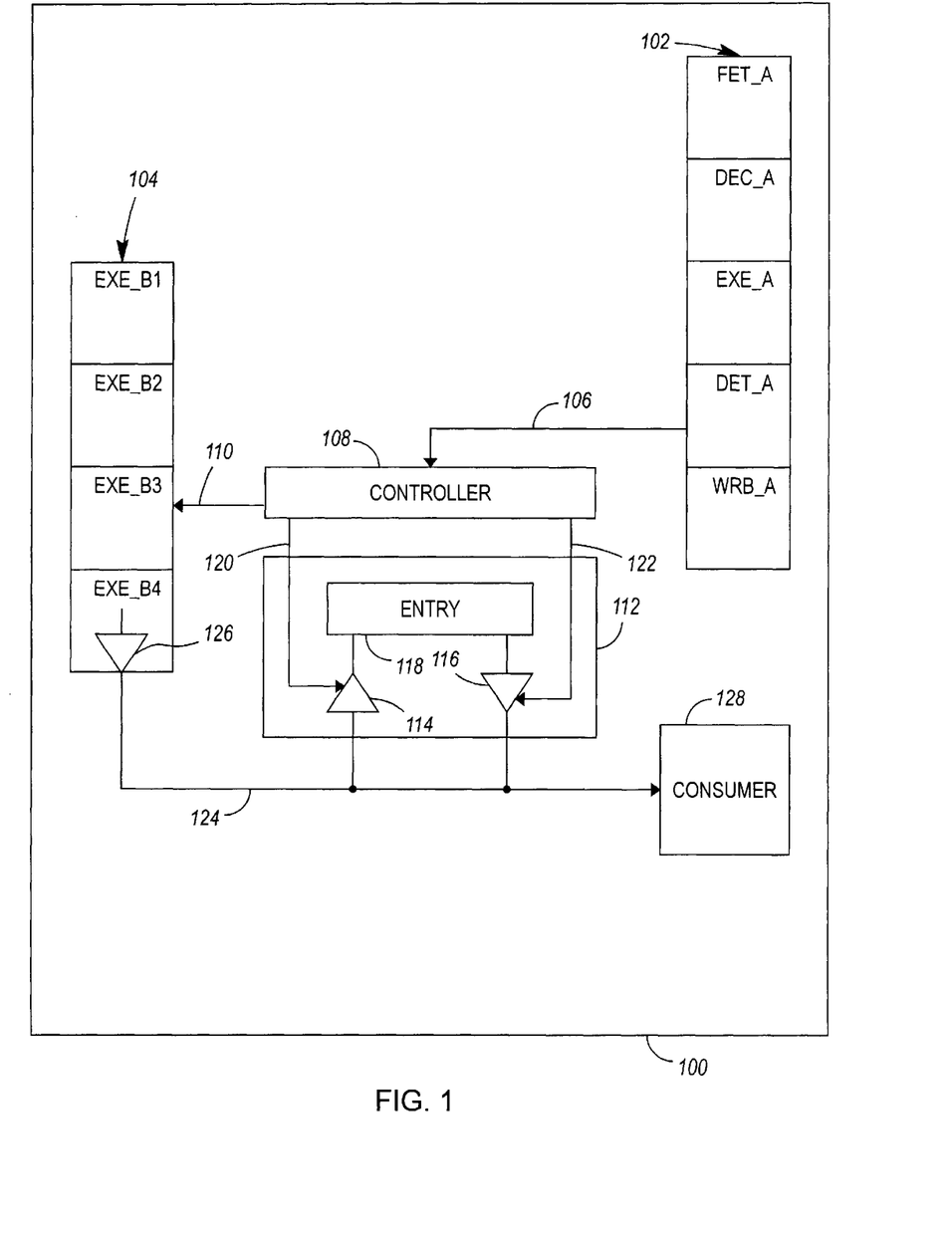
FIG. 1 illustrates a first embodiment of a microprocessor comprising a deferred stall register.
Figure 3:
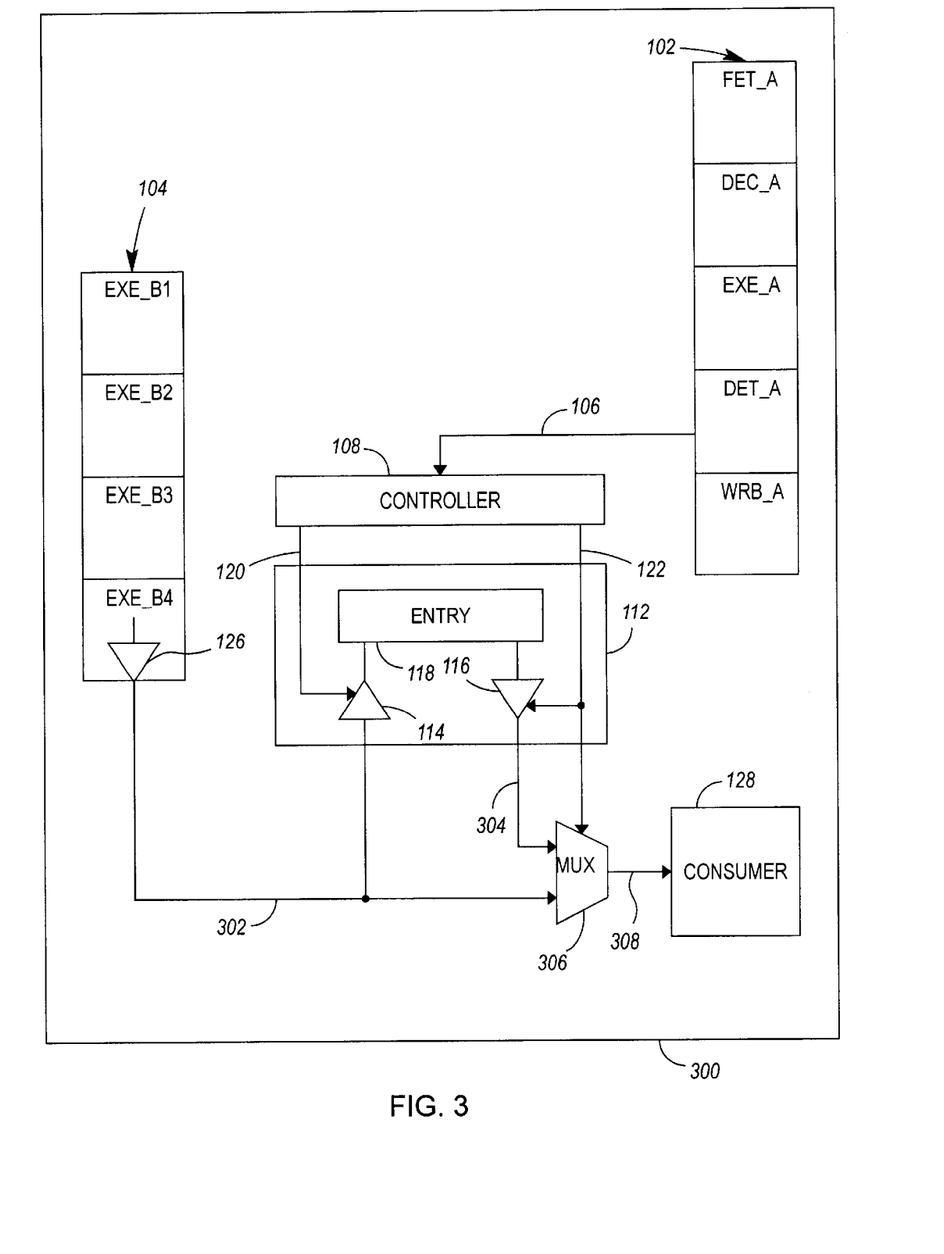
FIG. 3 illustrates a second embodiment of a microprocessor comprising a deferred stall register.

A microprocessor based method of stalling pipeline data may generally commence with, upon initiation of a stall, allowing data which it is desired to stall to propagate through N more stages of a pipeline 104 (FIGS. 1 & 3). N cycles after the stall is initiated, data 124, 302 output from a last of the N more stages (e.g., stage EXE_B4) is caused to be stored in a deferred stall register 112. N cycles after the stall is lifted, the data 118 stored in the deferred stall register 112 is caused to be output from the deferred stall register 112.

Microprocessor based apparatus which can be used to implement the above method is also generally illustrated in FIGS. 1 & 3. The apparatus comprises a deferred stall register 112, masking means 116, 306, and deferred stall register control means 108. In response to an asserted control signal 122, the masking means 116, 306 masks an output of stage X of a pipeline 104 (e.g., stage EXE_B4) with data 118 output from the deferred stall register 112. The deferred stall register control means 108 is responsive to a stall 106 and performs a couple of tasks. First, N cycles after a stall 106 is initiated, the deferred stall register control means 108 causes data 124, 302 which is output from stage X of the pipeline 104 to be stored in the deferred stall register 112. Second, N cycles after a stall 106 is lifted, the deferred stall register control means 108 1) causes data 118 stored in the deferred stall register 112 to be output from the deferred stall register 112, and 2) causes said masking means control signal 122 to be asserted. One can appreciate that N cycles after a stall 106 is initiated, the FIG. 2 apparatus delays data 124, 302 from propagating past stage X of the pipeline 104.

A microprocessor 100, 300 which can be designed to incorporate the above method and/or apparatus is also generally illustrated in FIGS. 1 & 3. The microprocessor 100, 300 comprises multiple parallel pipelines 102, 104, a deferred stall register 112, and a deferred stall register controller 108. The multiple parallel pipelines 102, 104 comprise at least a first pipeline 102 and a second pipeline 104, with the first pipeline 102 comprising a stage Y (e.g., stage DET_A) which periodically generates a stall 106. The deferred stall register controller 108 comprises logic 200, 202, 204, 212 (FIG. 2) which, in response to a stall 106 being initiated, generates a load signal 120. The deferred stall register controller 108 also comprises logic 206, 208, 210, 212 which, in response to a stall 106 being lifted, generates a drive signal 122. The deferred stall register 112 of the microprocessor 100, 300 comprises a data input 114 for loading into the deferred stall register 112, N cycles after a stall 106 is initiated, data 124, 302 which is produced by a stage X of the second pipeline 104 (e.g., stage EXE_B4). The data input 114 is enabled by the load signal 120 which is generated by the deferred stall register controller logic 200, 202, 204, 212. The deferred stall register 112 also comprises a data output 116 for driving data 118 out of the deferred stall register 112 N cycles after a stall 106 is lifted. The data output 116 is enabled by the drive signal 122 which is generated by the deferred stall register controller logic 206–212.

Having generally described a method and apparatus for stalling a pipeline data in the preceding paragraphs, the method and apparatus will now be described in greater detail.

FIG. 1 illustrates a microprocessor 100 which is constructed in accordance with a first embodiment of the invention. Although the microprocessor 100 is illustrated with first and second pipelines 102, 104, the microprocessor 100 could also comprise more or fewer pipelines. By way of example, the first pipeline 102 illustrated in FIG. 1 has five sequential stages which are denoted Fetch (FET_A), Decode (DEC_A), Execute (EXE_A), Exception Detect (DET_A) and Writeback (WRB_A). The second pipeline 104 illustrated in FIG. 2 has four stages which are denoted as Execute stages 1–4 (EXE_B1, EXE_B2, EXE_B3, EXE_B4).

The DET_A stage of the first pipeline 102 determines whether data in the DET_A stage might result in an exception (i.e., fault) if the data were allowed to propagate through to the pipeline's WRB_A stage and be committed to the microprocessor's architected state. If the DET_A stage determines that an exception might occur, the stage initiates a stall of the second pipeline 104 by asserting a stall signal 106. The purpose of the stall is to insure that the results of instructions being processed in the second pipeline 104 are not committed to the microprocessor's architected state when 1) an instruction has caused an exception in the DET_A stage of the first pipeline 102, and 2) the instructions being processed in the second pipeline 104 are at or behind the excepting instruction in program order. In the above case, instructions being processed in stages EXE_B1 and EXE_B2 are, by design, known to be programmatically at or behind an instruction which causes an exception in the DET_A stage of the first pipeline 102.

When the first pipeline 102 resolves an exception in its DET_A stage, and the first pipeline 102 is once again ready to continue processing instructions, the first pipeline 10 de-asserts the stall signal 106 and "lifts" a stall.

In the past, data in stages EXE_B1 and EXE_B2 of the second pipeline 104 has had to be stalled by latching the data within each of these stages. When the timing of a pipeline stage is critical, the need to implement a number of latches in the stage for the purpose of stalling data can adversely effect the timing of such a stage. Furthermore, when a stall such as that generated by the DET_A stage of the first pipeline 102 comes late in a cycle of the second pipeline 104, it is possible that one or more stages of the second pipeline 104 might not be able to use a clock signal to latch stalled data. In such a case, data would have to be stalled in these stages using recirculating latches. As a result, it would be necessary to route a stall signal across the stage. This also has an adverse timing impact on the second pipeline 104.

In FIG. 1, the implementation of stall latches in the EXE_B2 stage of the second pipeline 104 is avoided by allowing the stage to remain active after the DET_A stage of the first pipeline 102 initiates a stall. Data which exists in stage EXE_B2 at the time of the stall therefore continues to be processed by the pipeline 104 until it is output from stage EXE_B4. At this time, data 124 which is output from stage EXE_B4 is loaded into a deferred stall register 112, delayed for a number of cycles equal to the length of the stall, and then output from the deferred stall register 112 in a way that it masks the regular output 124 of stage EXE_B4.

The stall of pipeline data which exists in the EXE_B2 stage of the second pipeline 104 at the time a stall is initiated is accomplished by coupling the stall signal 106 generated by the first pipeline 102 to an input of a deferred stall register controller 108. In response to an assertion of the stall signal 106 (i.e., a stall initiation), the controller 108 generates a load signal 120 which causes data 124 output from stage EXE_B4 to be loaded into the deferred stall register 112 N cycles after a stall is initiated. N is the number of cycles that it takes to clock data from A) a pipeline stage which holds data it is desired to stall to B) the output 124 of a pipeline stage which is coupled to a deferred stall register 112. In FIG. 1, N=2. Note that in FIG. 1, the load signal 120 which is generated by the deferred stall register controller 108 is coupled to the enable input of a load buffer 114. As will be understood by those skilled in the art, a load input/buffer 114 of the deferred stall register 112 could be enabled in a variety of ways.

Note that the load buffer 114 which is illustrated in FIG. 1 is symbolic of any number of buffers which might be used to load an output 124 of the second pipeline's EXE_B4 stage into the deferred stall register 112 (e.g., the load of a 64-bit value into the deferred stall register 112 is preferably accomplished via sixty-four parallel load buffers, or alternately, some other number of load buffers 114 which is greater than one).

The output of data 118 stored in the deferred stall register 112 is accomplished in much the same way as a load of data 124 into the deferred stall register 112. In response to a de-assertion of the stall signal 106 (i.e., a stall lift), the controller 108 generates a drive signal 122 which causes data 118 stored in the deferred stall register 112 to be output from the register 112 N cycles after a stall is lifted. N is once again the number of cycles that it takes to clock data from A) a pipeline stage which holds data it is desired to stall to B) the output 124 of a pipeline stage which is coupled to a deferred stall register 112. However, instead of stalling data in stage EXE_B2 during the stall, so that the stalled data propagates to the output of stage EXE_B4 N cycles after a stall is lifted, the data is instead stored in the deferred stall register 112 during the stall, and then output from the deferred stall register 112 in a way that it masks the regular output 124 of the EXE_B4 stage N cycles after the stall is lifted. The effect of the two stall methods (i.e., the old and new methods) on a microprocessor's architected state is therefore the same.

Data 118 may be stored in the deferred stall register using clocked latches, recirculating latches, or any other storage means.

Note that in FIG. 1, the drive signal 122 which is generated by the deferred stall register controller 108 is coupled to the enable input of a drive buffer 116. As will be understood by those skilled in the art, the drive input/buffer 116 of the deferred stall register 112 could be enabled in a variety of ways. Furthermore, similarly to the load buffer 114 which illustrated in FIG. 1, the drive buffer 116 is symbolic of any number of buffers which might be used to drive data 118 out of the deferred stall register 112 (e.g., the driving of a 64-bit value out of the deferred stall register 112 is preferably accomplished via sixty-four parallel drive buffers, or alternately, some other number of drive buffers 116 which is greater than one).

Another signal which the deferred stall register controller 108 provides in FIG. 1 is a signal 110 which prevents the EXE_B4 stage of the second pipeline 104 from driving its output 124 at the same time that the drive buffer 116 of the deferred stall register 112 is enabled. This signal 110 can be provided directly to a drive buffer 126 in stage EXE_B4, which drive buffer 126 is similar to the drive buffer 116 of the deferred stall register 112. Alternatively, the signal 110 can be provided to some other portion of the pipeline 104, which portion insures that stage EXE_B4 does not drive data at the same time that the deferred stall register 112 is driving data. The precise architecture of the second pipeline 104 will determine when and to where an anti-drive signal 110 is provided.

The "consumer" 128 which is illustrated in FIG. 1 may be a microprocessor's architected state, in which case the bus 124 preceding the consumer might be a result bus. The consumer 128 might also comprise additional stages of the second pipeline 104 (not shown), or some other structure which is intended to receive data 124 which is output from stage EXE_B4 of the second pipeline 104.

Figure 2:
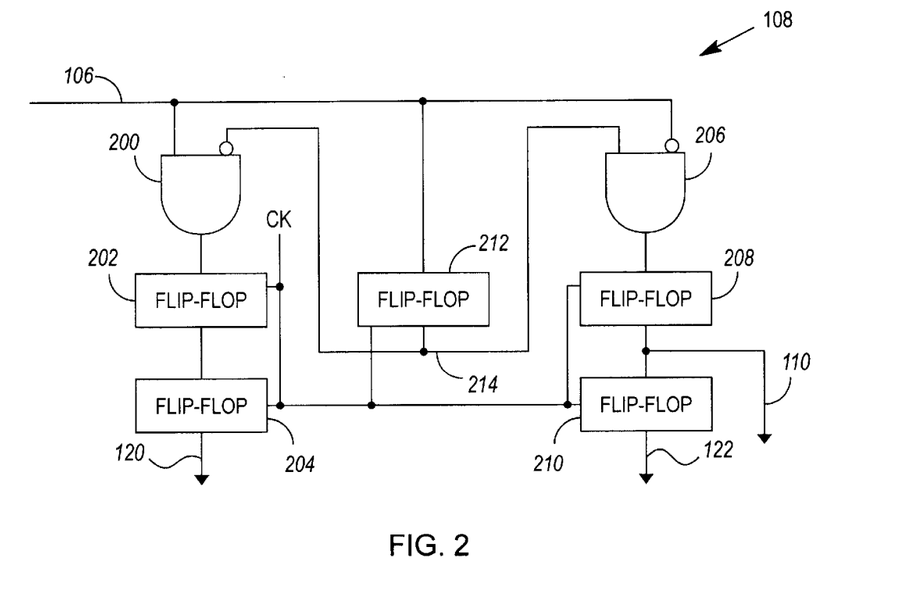
FIG. 2 illustrates an embodiment of the deferred stall register controller illustrated in FIG. 1.

A preferred embodiment of FIG. 1's deferred stall register controller 108 is illustrated in FIG. 2. The controller 108 comprises two sets of cascaded storage elements 202/204, 208/210 (e.g., flip-flops). The first set of flip-flops 202, 204 is used to generate the controller's load signal 120, and the second set of flip-flops 208, 210 is used to generate the controller's drive signal 122. A stall signal 106 which is input to the controller 108 is received by an input of a first AND gate 200, by an inverted input of a second AND gate 206, and by the input of a trigger flip-flop 212. The trigger flip-flop 212 assists in appropriately enabling either the first set of cascaded flip-flops 202, 204 or the second set of cascaded flip-flops 208, 210. To this end, the trigger flip-flop 212 provides a new state 214 of a received stall signal 106 to each of the AND gates 200, 206 with a one cycle delay. The output 214 of the trigger flip-flop 212 is received at the first AND gate 200 via an inverted input of the AND gate 200.

In its steady state, the controller 108 receives a stall signal 106 with a logic zero value. Within one cycle, the AND gate 200 preceding the first set of cascaded flip-flops 202, 204 is therefore enabled, and the AND gate 206 preceding the second set of cascaded flip-flops 208, 210 is disabled. However, the logic zero value of the stall signal 106 insures that both AND gates 200, 206 are initially disabled. As a result, all of the cascaded flip-flops in each set 202, 204, 208, 210 soon (if not already) store a logic zero value. In this state, the controller 108 is ready to respond to a stall initiation.

A stall is initiated when the stall signal 106 transitions from a logic zero value to a logic one value. The first cycle after the initiation of a stall (i.e., after a rise of pipeline clock CK), the output of the first flip-flop 202 in the first set of cascaded flip-flops transitions to a logic one value. At the same time, the output 214 of the trigger flip-flop 212 transitions to a logic one value, thereby disabling the AND gate 200 preceding the first set of cascaded flip-flops 202, 204 and enabling the AND gate 206 preceding the second set of cascaded flip-flops 208, 210. After one more pipeline clock cycle, the output 120 of the second flip-flop 204 in the first set of cascaded flip-flops transitions to a logic one value, thus asserting the controller's load signal 120 and causing the load buffer 114 of the deferred stall register 112 to be enabled. However, due to the trigger flip-flop's disablement of the first AND gate 200 one cycle after it was enabled, the passing of a third cycle after a stall initiation results in a de-assertion of the controller's load signal 120, and thus a disablement of the deferred stall register's load buffer 114.

A stall condition may exist for any length time, without affecting the state of either the deferred stall register 112 or its controller 108. When a stall is lifted, the stall signal 106 transitions from a logic one value to a logic zero value. One pipeline clock cycle after such a transition, the first flip-flop 208 in the second set of flip-flops sees its output assume a logic one value. At the same time, the output 214 of the trigger flip-flop 212 transitions to a logic zero value, thereby disabling the AND gate 206 preceding the second set of cascaded flip-flops 208, 210, and re-enabling the AND gate 200 preceding the first set of cascaded flip-flops 202, 204. The controller 108 is therefore armed to respond to a next stall condition. After one more pipeline clock cycle, the output 122 of the second flip-flop 210 in the second set of cascaded flip-flops transitions to a logic one value, thus asserting the controller's drive signal 122 and causing the drive buffer 116 of the deferred stall register 112 to be enabled. However, due to the trigger flip-flop's disablement of the second AND gate 206 one cycle after it was enabled, the passing of a third cycle after the lift of a stall results in a de-assertion of the controller's drive signal 122, and thus a disablement of the deferred stall register's drive buffer 116.

In the embodiment of the invention illustrated in FIG. 1, it is assumed that the architecture of the second pipeline 104 requires receipt of the EXE_B4 anti-drive signal 110 one cycle before the EXE_B4 stage is not to drive its output 124. Such a signal 110 can therefore be generated by the output of the first flip-flop 208 in the second set of cascaded flip-flops of the FIG. 2 controller 108.

If it were necessary to increase the number of cycles which must pass before the deferred stall register 112 is enabled, additional flip-flops could be added to each of the cascaded sets 202/204, 208/210 illustrated in FIG. 2.

The apparatus set forth in FIGS. 1 & 2 could also be modified to accommodate a deeper deferred stall register 112 (i.e., a deferred stall register with a plurality of entries 118). For example, if it is desired to stall data which exists at the output of stage EXE_B2 at the time of a stall, data which exists in any sequentially preceding stage (e.g., EXE_B1) will also need to be stalled. If the use of clocked and/or recirculating latches allows data to be stored in these stages with no penalty, data may simply be stored in these stages as was done in the past. However, if these stages are also time critical, data heavy, or the like, it might be desirable to allow data which exists in these stages at the time of a stall to also propagate through additional stages of the second pipeline 104.

If the depth of the deferred stall register 112 is increased by M entries, M additional stages of data can be stored in the deferred stall register 112 by allowing the data to propagate through to the output 124 of stage EXE_B4, and then maintaining the deferred stall register's load buffer 114 in an enabled state for an additional M cycles following the load of a first data value into the deferred stall register 112. After all data has been loaded, the deferred stall register 112 will therefore hold M+1 entries worth of stalled pipeline data. To drive the M+1 entries of data from the deferred stall register 112, the register's drive buffer 116 needs to remain enabled for M+1 cycles, and data needs to be driven from the deferred stall register 112 on a first-in, first out (FIFO) basis.

The implementation of an indexing means for a multi-entry deferred stall register 112 is believed to be well within the abilities of one skilled in the art, and is therefore believed to be beyond the scope of what needs to be set forth in this disclosure. A deferred stall register controller 108 for enabling each of the deferred stall register's load/drive buffers 114, 116 for M+1 cycles can be achieved by simply substituting a third set of cascaded flip-flops for FIG. 2's single trigger flip-flop 212.

FIG. 3 illustrates an alternative embodiment of the invention. The deferred stall register 112 and controller 108 for same which are illustrated in FIG. 3 are essentially identical to those disclosed in FIG. 1. The difference between the two figures is in the connections between the second pipeline 104, the deferred stall register 112, and the deferred stall register controller 112. Instead of the outputs of the deferred stall register 112 and stage EXE_B4 of the second pipeline connecting to a common bus 124, the outputs of these structures are received at first and second data inputs of a multiplexer 306, which multiplexer 306 receives the deferred stall register's drive buffer enable signal 122 at its control input. In this manner, the output 302 of stage EXE_B4 is provided to a consumer process 128 but for when the deferred stall register 112 needs to drive data 118 to the consumer process 128. The second embodiment of the invention is particularly advantageous when 1) the deferred stall register 112 comprises multiple entries, and 2) there is a possibility that a stall will span fewer cycles than there are entries which need to be filled in the deferred stall register 112. In such a case, the second embodiment of the invention would allow data to be simultaneously loaded into, and driven from, entries 118 in the deferred stall register 112.

Note that FIGS. 1 & 3 both indicate that a stall signal 106 is generated by another pipeline 102. Although the invention was designed for the purpose of synchronizing two or more pipelines 102, 104, one or more of which might send a stall signal 206 to the other pipelines, the invention can be used in any situation where it is necessary to stall pipeline data.

Figure 4:
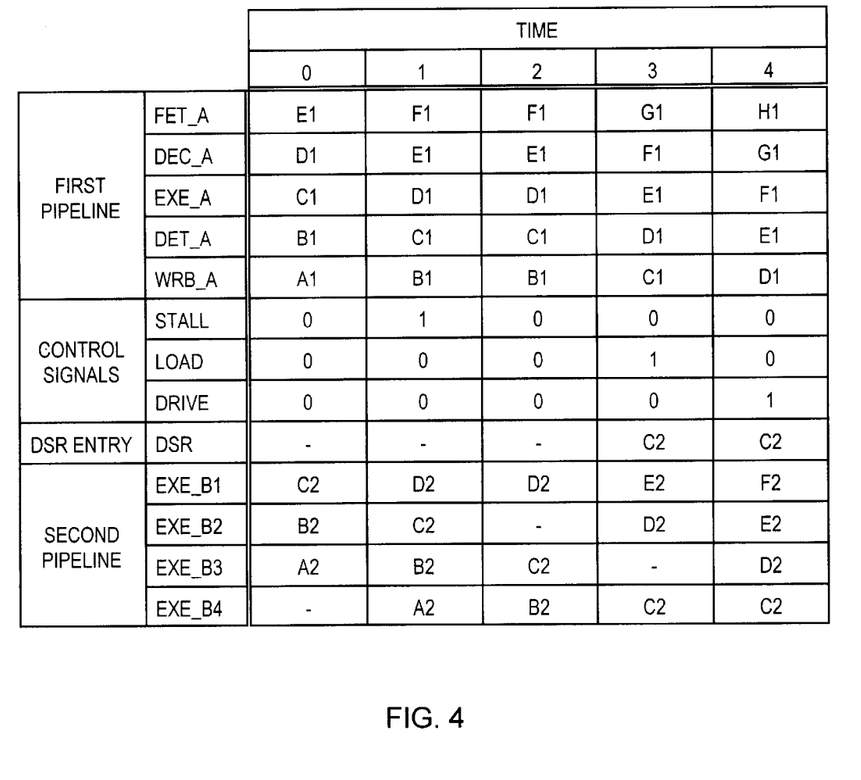
FIG. 4 illustrates an exemplary data progression through the first and second pipelines of the FIG. 1 microprocessor.

FIG. 4 illustrates an exemplary progression of data through the first 102 and second 104 pipelines of FIG. 1.

The following convention is adopted in FIG. 4: Data values appearing in the table are assumed to be the data values which appear at a pipeline stage's output at time T.

The progression of data through the first pipeline 102 will be examined first. Initially, at T=0, the outputs of the five stages of the first pipeline 102 respectively carry data values A1, B1, C1, D1 and E1. One cycle later, at T=1, each data value propagates to the output of a next sequential pipeline stage, and a new data value F1 appears at the output of the FET_A stage. Sometimes during T=0, a possible exception is detected in the DET_A stage, and at time T=1, a stall initiation signal 106 is provided to the deferred stall register controller 108. Because of the stall generated by the DET_A stage, the same data appears at the outputs of the first pipeline's stages at times T=1 and T=2. It is assumed that the stall is resolved during time T=1 so that at time T=2, a stall lift signal 106 is provided to the deferred stall register controller 108. Data therefore resumes its progression through the first pipeline 102 during times T=3 and T=4.

The deferred stall register controller's receipt of a stall initiation signal 106 at time T=1 causes the controller 108 to generate a load enable signal 120 at time T=3. Likewise, the controller's receipt of a stall lift signal 106 at time T=2 causes the controller to generate a drive enable signal 122 at time T=4.

At time T=0, the outputs of the four stages of the second pipeline 104 respectively carry data values "–", A2, B2 and C2. One cycle later, at T=1, each data value propagates to the output of a next sequential pipeline stage. Even though a stall is initiated at time T=1, the data which exists at the output of stage EXE_B2 is allowed to propagate to stage EXE_B3 during time T=2 . However, the output of stage EXE_B1 is presumed to be stalled using recirculating latches which are a part of stage EXE_B1. Data existing at the outputs of stages EXE_B3 and EXE_B4 also propagates through the pipeline at time T=2. At time T=3, all data values once again advance in the second pipeline 104, and a new data value, E2, enters stage EXE_B1 of the pipeline 104. Also during time T=3, the assertion of the deferred stall register controller's load signal 120 causes the output 124 of stage EXE_B4 to be loaded into the deferred stall register 112. At time T=4, the data value 118 which was loaded into the deferred stall register 112 during the last cycle is output from the deferred stall register 112 so as to mask the regular output 124 of stage EXE_B4. As a result, the same data value appears at the output 124 of stage EXE_B4 at both times T=3 and T=4.

Figure 5:
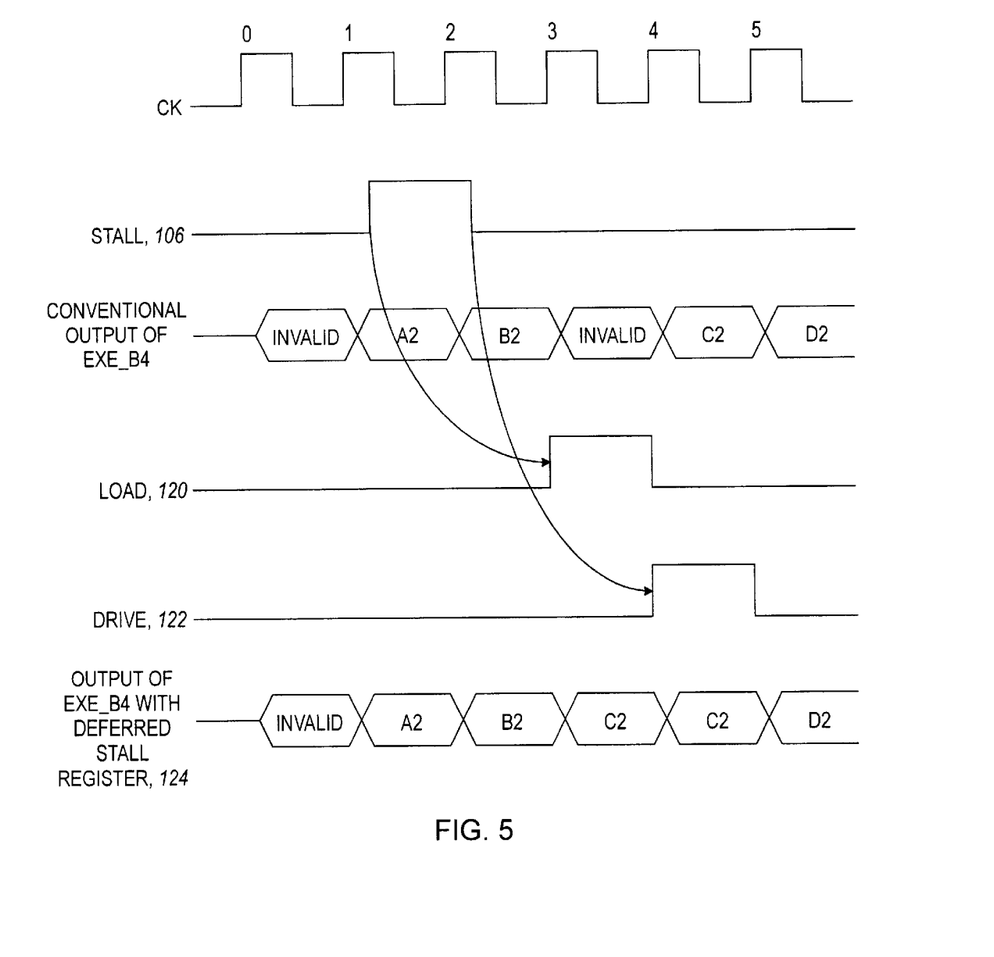
FIG. 5 illustrates an exemplary output of stage EXE_B4 of the second pipeline illustrated in FIG. 1, and compares this output to the conventional output of a similar stage EXE_B4.

FIG. 5 illustrates the output 124 of stage EXE_B4 of the second pipeline 104 as it would appear given the data progression scenario introduced in FIG. 4. However, in FIG. 5, the output 124 of stage EXE_B4 appears as a signal waveform. FIG. 5 also compares the output 124 of stage EXE_B4 with an output of a conventional stage EXE_B4 (e.g., an output of stage EXE_B4 which might be generated if data which existed at stage EXE_B2 at the time of a stall were to be stalled using recirculating latches which are implemented as part of stage EXE_B2). Note that the conventional EXE_B4 output is invalid at time T=3, but valid at time T=4. By using the deferred stall register 112 illustrated in FIG. 1, the output 124 of stage EXE_B4 is valid at times T=3 and T=4 . However, the output of stage EXE_B4 is ignored by a "consumer" process 128 at time T=3 in both cases. As a result, a consumer process 128 receives valid data when it expects to receive it under both a conventional stall method, as well as the new stall methods disclosed herein. The advantage to using the new stall methods, however, is that stall latches (and possibly recirculating latches) do not need to be implemented in a pipeline stage when doing so would have a negative timing impact on the pipeline stage.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A microprocessor based method of stalling pipeline data, comprising:
   a) upon initiation of a stall, allowing data that is to be stalled to propagate through N more stages of a pipeline;
   b) N cycles after the stall is initiated, causing data output from a last of the N more stages to be stored in a deferred stall register; and
   c) N cycles after the stall is lifted, causing the data stored in step b) to be output from the deferred stall register.

2. A method as in claim 1, wherein the N more stages of the pipeline are the last N stages of the pipeline, the method further comprising, N cycles after the stall is lifted, masking a regular output of the pipeline with data output from the deferred stall register.

3. A method as in claim 1, wherein the pipeline comprises a stage P which sequentially follows the N more stages, the method further comprising, N cycles after the stall is lifted, injecting data output from the deferred stall register into an input of stage P, rather than injecting data output from the last of the N more stages into said input of stage P.

4. A method as in claim 1, further comprising, upon initiation of the stall, stalling data in each stage of the pipeline which is greater than N cycles upstream from the output of the last of the N more stages.

5. A method as in claim 1, wherein the deferred stall register comprises multiple entries, and wherein the pipeline further comprises M stages which sequentially precede the N more stages, the method further comprising:
   a) upon initiation of the stall, allowing data existing in the M stages to continue propagating through the pipeline;
   b) beginning N+1 cycles after the stall is initiated, causing M cycles of data output from the last of the N more stages to be stored in M entries of the deferred stall register; and
   c) beginning N+1 cycles after the stall is lifted, causing the M cycles of data stored in step b) to be sequentially output from the M entries of the deferred stall register.

6. A method as in claim 1, further comprising storing data in the deferred stall register using a number of recirculating latches.

7. Microprocessor based apparatus which, N cycles after initiation of a stall, delays data from propagating past a stage X of a pipeline, the apparatus comprising:
   a) a deferred stall register;
   b) masking means which, in response to an asserted control signal, masks an output of stage X of the pipeline with data output from the deferred stall register; and
   c) deferred stall register control means, responsive to said stall, for:
      i) N cycles after said stall is initiated, causing data which is output from stage X of the pipeline to be stored in the deferred stall register; and
      ii) N cycles after said stall is lifted, causing the data stored in step c) i) to be output from the deferred stall register, and causing said masking means control signal to be asserted.

8. Apparatus as in claim 7, wherein the pipeline further comprises M stages which sequentially precede stage X, and wherein:
   a) the deferred stall register comprises multiple entries;
   b) the deferred stall register control means, beginning N+1 cycles after the stall is initiated, causes M cycles of data which are output from stage X of the pipeline to be stored in M entries of the deferred stall register; and
   c) the deferred stall register control means, beginning N+1 cycles after the stall is lifted, causes the M cycles of data stored in step b) to be sequentially output from the deferred stall register, and causes said masking means control signal to be asserted.

9. Apparatus as in claim 7, wherein the deferred stall register comprises a number of recirculating latches for storing data.

10. A microprocessor, comprising:
    a) multiple parallel pipelines comprising at least a first pipeline and a second pipeline, wherein the first pipeline comprises a stage Y which periodically generates a stall;
    b) a deferred stall register controller comprising logic which:
       i) in response to said stall being initiated, generates a load signal; and
       ii) in response to said stall being lifted, generates a drive signal; and
    c) a deferred stall register, comprising:
       i) a data input for loading into the deferred stall register, N cycles after said stall is initiated, data which is produced by a stage X of the second pipeline, said data input being enabled by said load signal;
       ii) a data output for driving data out of the deferred stall register N cycles after said stall is lifted, said data output being enabled by said drive signal.

11. A microprocessor as in claim 10, further comprising a result bus, wherein:
    a) the output of stage X of the second pipeline is coupled to the result bus;
    b) the data output of the deferred stall register is coupled to the result bus; and
    c) said logic of the deferred stall register controller, in response to said stall, provides a signal to the second pipeline, which signal prevents stage X from driving its output to the result bus when the data output of the deferred stall register is enabled.

12. A microprocessor as in claim 10, further comprising a multiplexer and a result bus, wherein:
    a) the output of stage X of the second pipeline is coupled to a first data input of the multiplexer;
    b) the data output of the deferred stall register is coupled to a second data input of the multiplexer;
    c) a data output of the multiplexer is coupled to the result bus; and
    d) said logic of the deferred stall register controller operates a control input of the multiplexer to cause data at the second input of the multiplexer to be output from the multiplexer when the data output of the deferred stall register is enabled.

13. A microprocessor as in claim 10, wherein the second pipeline further comprises a stage P which sequentially follows stage X, and wherein:
    a) the output of stage X of the second pipeline is coupled to an input of stage P;
    b) the data output of the deferred stall register is coupled to said input of stage P; and
    c) said logic of the deferred stall register controller, in response to said stall, provides a signal to the second pipeline, which signal prevents stage X from driving its output to said input of stage P when the data output of the deferred stall register is enabled.

14. A microprocessor as in claim 10, further comprising a multiplexer, and wherein the second pipeline further comprises a stage P which sequentially follows stage X, wherein:
   a) the output of stage X of the second pipeline is coupled to a first data input of the multiplexer;
   b) the data output of the deferred stall register is coupled to a second data input of the multiplexer;
   c) a data output of the multiplexer is coupled to an input of stage P; and
   d) said logic of the deferred stall register controller operates a control input of the multiplexer to cause data at the second input of the multiplexer to be output from the multiplexer when the data output of the deferred stall register is enabled.

15. A microprocessor as in claim 10, wherein the deferred stall register controller comprises:
   a) a first number of cascaded storage elements comprising a storage element A, which storage element A asserts said load signal and enables said data input of the deferred stall register N cycles after said stall is initiated; and
   b) a second number of cascaded storage elements comprising a storage element B, which storage element B asserts said drive signal and enables said data output of the deferred stall register N cycles after said stall is lifted.

16. A microprocessor as in claim 15, wherein a storage element C in the second number of cascaded storage elements asserts a signal which prevents stage X of the second pipeline from driving its output when the data output of the deferred stall register is enabled.

17. A microprocessor as in claim 10, wherein the second pipeline is a floating point pipeline.

18. A microprocessor as in claim 10, wherein a stage of the second pipeline which is synchronized with stage Y of the first pipeline performs part of a multiply operation.

19. A microprocessor as in claim 10, wherein the deferred stall register comprises a number of recirculating latches for storing data.

20. A microprocessor as in claim 10, wherein the deferred stall register comprises multiple entries, and wherein:
   a) N cycles after said stall is initiated, said data input is enabled by said load signal for M cycles, and data is stored in M entries of said deferred stall register; and
   b) N cycles after said stall is lifted, said data output is enabled by said drive signal for M cycles, and data is output from said deferred stall register on a first-in, first-out basis.

21. A microprocessor as in claim 10, further comprising means for, upon initiation of said stall, stalling data in each stage of the second pipeline which is greater than N cycles upstream from the output of stage X of the second pipeline.

* * * * *

UNITED STATES PATENT AND TRADEMARK OFFICE
CERTIFICATE OF CORRECTION

| | |
|---|---|
| PATENT NO. | : 6,910,122 B1 |
| APPLICATION NO. | : 09/507204 |
| DATED | : June 21, 2005 |
| INVENTOR(S) | : Stephen L. Bass et al. |

It is certified that error appears in the above-identified patent and that said Letters Patent is hereby corrected as shown below:

On the Title Page, Item (54) and in the Specification, Column 1, Line 1, Title:

Delete "METHOD" and insert -- METHODS --, therefor.

Signed and Sealed this
Eighth Day of October, 2013

Teresa Stanek Rea
*Deputy Director of the United States Patent and Trademark Office*